United States Patent [19]

Hinrichs et al.

[11] Patent Number: 5,295,999
[45] Date of Patent: Mar. 22, 1994

[54] DYESTUFF MIXTURES

[75] Inventors: Rolf Hinrichs, Leverkusen; Peter Wild, Odenthal, both of Fed. Rep. of Germany

[73] Assignee: Bayer Aktiengesellschaft, Leverkusen, Fed. Rep. of Germany

[21] Appl. No.: 6,590

[22] Filed: Jan. 21, 1993

[30] Foreign Application Priority Data

Jan. 30, 1992 [DE] Fed. Rep. of Germany ........ 4202527

[51] Int. Cl.$^5$ .............................................. C09B 29/00
[52] U.S. Cl. ............................................ 8/641; 8/639; 8/662
[58] Field of Search ..................... 8/638, 639, 641, 662

[56] References Cited

U.S. PATENT DOCUMENTS

| | | | |
|---|---|---|---|
| 4,754,020 | 6/1988 | Wolff et al. | 534/581 |
| 4,968,318 | 11/1990 | Wiegner et al. | 8/639 |
| 4,995,885 | 2/1991 | Morawietz | 8/527 |
| 5,173,086 | 12/1992 | Bermes | 8/527 |

FOREIGN PATENT DOCUMENTS

| | | |
|---|---|---|
| 0201690 | 11/1986 | European Pat. Off. . |
| 03569940 | 5/1990 | European Pat. Off. . |
| 0479056 | 4/1992 | European Pat. Off. . |
| 2221666 | 11/1992 | Fed. Rep. of Germany . |
| 2135265 | 12/1972 | France . |
| 1333023 | 10/1973 | United Kingdom . |

*Primary Examiner*—Helene Klemanski
*Attorney, Agent, or Firm*—Sprung Horn Kramer & Woods

[57] ABSTRACT

The dyestuff mixtures comprising the dyestuff of the formula (I)

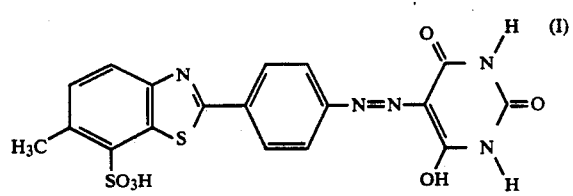

and a dyestuff of the formula

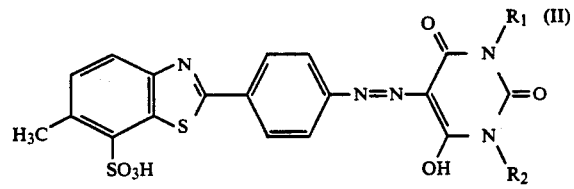

wherein
$R_1$ and $R_2$ independently of one another represent alkyl, cycloalkyl or aryl, and/or tautomeric forms of the dyestuffs of the formulae (I) and/or (II), are particularly suitable for the preparation of concentrated, storage-stable dyestuff solutions which, apart from a small amount of alkanolamines, comprise no further water-soluble organic solubilising agents.

9 Claims, No Drawings

DYESTUFF MIXTURES

The present invention relates to dyestuff mixtures comprising the dyestuff of the formula (I)

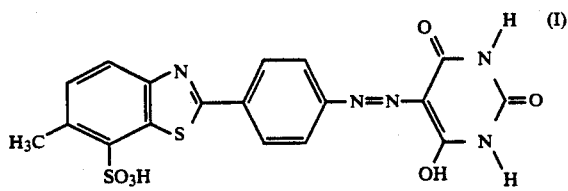

and a dyestuff of the formula

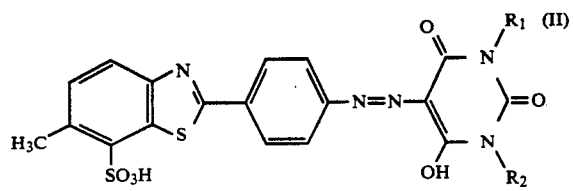

wherein $R_1$ and $R_2$ independently of one another represent alkyl, cycloalkyl or aryl, and/or tautomeric forms of the dyestuffs of the formulae (I) and/or (II).

Preferred dyestuff mixtures are those comprising the dyestuff of the formula (I) and a dyestuff of the formula (II) wherein $R_1$ and $R_2$ independently of one another represent $C_1$–$C_6$-alkyl, $C_3$–$C_6$-cycloalkyl or $C_6$–$C_{10}$-aryl, and/or tautomeric forms thereof.

Particularly preferred dyestuff mixtures are those comprising the dyestuff (I) and a dyestuff of the formula (II) wherein $R_1$ and $R_2$ independently of one another represent $C_1$–$C_4$-alkyl, and/or tautomeric forms thereof.

Especially preferred dyestuff mixtures are those comprising 5 to 25 parts by weight of the dyestuff of the formula (I) and 0.2 to 5 parts by weight of the dyestuff of the formula

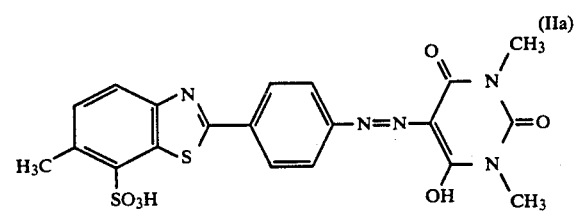

and/or tautomeric forms thereof.

The formulae (II) and (IIa) shown in each case represent only one of the possible tautomeric forms. However, the invention in each case includes all the tautomeric forms.

Examples of alkyl in the definition of $R^1$ and $R^2$ are methyl, ethyl, n- and iso-propyl, n-, iso- and tert-butyl and straight-chain and branched pentyl and hexyl radicals.

Examples of cycloalkyl in the definition of $R^1$ and $R^2$ are cyclopropyl, cyclopentyl and cyclohexyl.

Examples of aryl in the definition of $R_1$ and $R_2$ are phenyl and naphthyl.

The dyestuffs of the formulae (I) and (II) and tautomeric forms thereof are known (compare, for example, DE-A 2,221,666 and EP-A 0,369,940) and can be prepared in a known manner, for example by coupling the diazotisation product of 2-(p-aminophenyl)-6-methyl-7-benzothiazolesulphonic acid to barbituric acid or a corresponding barbituric acid derivative.

The dyestuff mixtures of the dyestuffs (I) and (II) according to the invention and/or tautomeric forms thereof are particularly suitable for the preparation of concentrated, storage-stable solutions of these dyestuffs.

The present invention furthermore relates to concentrated aqueous dyestuff solutions comprising a mixture of the dyestuffs of the formulae (I) and (II) and/or tautomeric forms thereof.

The dyestuff solutions according to the invention preferably comprise up to 2 to 30 parts by weight of a mixture of the dyestuffs (I) and (II) and/or tautomeric forms thereof and 98 to 50 parts by weight of water.

Preferred concentrated dyestuff solutions are those comprising mixtures of the dyestuff of the formula (I) with a dyestuff of the formula (II) wherein $R_1$ and $R_2$ independently of one another represent $C_1$–$C_6$-alkyl, $C_3$–$C_6$cyclohexyl or $C_6$–$C_{10}$-aryl, and/or tautomeric forms thereof.

Particularly preferred dyestuff solutions are those comprising mixtures of the dyestuff of the formula (I) with a dyestuff of the formula (II) wherein $R_1$ and $R_2$ independently of one another represent $C_1$–$C_4$-alkyl, and/or tautomeric forms thereof.

Especially preferred dyestuff solutions are those comprising mixtures of the dyestuff of the formula (I) with the dyestuff of the formula (IIa)

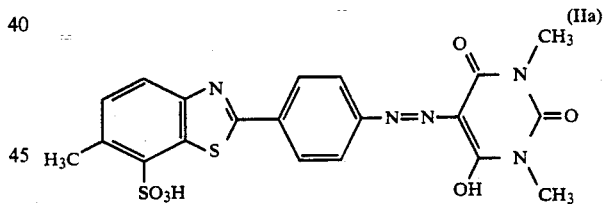

and/or tautomeric forms thereof.

The dyestuff solutions according to the invention preferably comprise 5 to 25 parts by weight of the dyestuff of the formula (I) and/or tautomeric forms thereof and 0.2 to 5 parts by weight of a dyestuff of the formula (II) and/or tautomeric forms thereof and 94.8 to 70 parts by weight of water.

The dyestuff solutions according to the invention can comprise customary additives, such as, for example, urea, formamide, ε-caprolactam, dimethylformamide and polyhydric alcohols, such as, for example, ethylene glycol, propylene glycol or glycerol. These additives are added in the amounts customary for the substances mentioned.

The dyestuff solutions according to the invention preferably comprise 1 to 10 parts by weight of triethanolamine, as well as 0 to 1 part by weight of diethanolamine and 0 to 1 part by weight of lithium hydroxide.

Apart from triethanolamine and, if appropriate, diethanolamine and lithium hydroxide, the dyestuff solutions according to the invention preferably comprise no further additives.

Particularly preferred dyestuff solutions according to the invention comprise

- 5-25 parts by weight of the dyestuff of the formula (I) and/or tautomeric forms thereof,
- 0.2-5 parts by weight of a dyestuff of the formula (II) and/or tautomeric forms thereof,
- 1-10 parts by weight of triethanolamine,
- 0-1 part by weight of diethanolamine,
- 0-1 part by weight of lithium hydroxide and
- 93.8-58 parts by weight of water.

An especially preferred dyestuff solution according to the invention comprises

- 7-25 parts by weight of the dyestuff of the formula (I) and/or tautomeric forms thereof,
- 0.2-2 parts by weight of the dyestuff of the formula (IIa) and/or tautomeric forms thereof,
- 1-5 parts by weight of triethanolamine,
- 0.1-0.5 part by weight of diethanolamine,
- 0.1-0.5 part by weight of lithium hydroxide and
- 91.6-67 parts by weight of water.

Concentrated solutions of a dyestuff of the formula (I) or (II) are known, for example, from EP 0,369,940.

However, these dyestuff solutions comprise large amounts of organic solubilising agents for stabilisation, and nevertheless their storage stability does not meet all the requirements imposed on them.

The dyestuff solutions according to the invention preferably comprise only a small amount of not more than 12 parts by weight of the organic solubilising agents triethanolamine, diethanolamine and LIOH, and moreover are preferably free from further water-soluble organic solubilising agents, such as, for example, urea, formamide, ε-caprolactam, dimethylformamide or polyhydric alcohols, such as, for example, ethylene glycol, propylene glycol and glycerol.

The dyestuff solutions according to the invention moreover are distinguished by an improved storage stability, compared with the prior art.

The dyestuff mixtures according to the invention can be prepared by using a mixture of preferably 0.60 to 0.98 mol of barbituric acid and 0.02 to 0.40 mol of barbituric acid derivative of the formula (III)

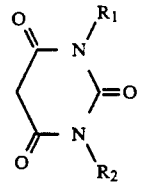 (III)

wherein

R₁ and R₂ have the widest meaning given in the case of formula (II), per mole of diazotised 2-(p-aminophenyl)-6-methyl-7-benzothiazolesulphonic acid.

The coupling is preferably carried out in water and preferably in the presence of triethanolamine and if appropriate in the presence of diethanolamine and lithium hydroxide, at a temperature in the range from 20° to 40° C.

The concentrated aqueous dyestuff solutions according to the invention are in general prepared in a manner such that the betaine of the diazotised 2-(p-aminophenyl)-6-methyl-7-benzothiazolesulphonic acid is washed with demineralised water until the salt content is low, and is then coupled with a mixture—consisting of barbituric acid and a coupling component of the formula (III)—in demineralised water directly to give the solution containing triethanolamine and if appropriate diethanolamine and lithium hydroxide, and the solution is brought to the desired tinctorial strength with water.

The pH of the dyestuff solutions according to the invention is preferably in a range between pH 6.5 and 8.5, in particular between pH 7 and 7.5.

The resulting concentrated aqueous dyestuff mixtures are distinguished, above all, by a good storage stability at temperatures of from −8° C. to +40° C.

The dyestuff solutions according to the invention are used in particular for dyeing and printing paper.

The dyeings on paper obtained with them are distinguished by good light- and wet-fastness properties and by a brilliance and clarity of the colour shades.

EXAMPLE 1

139.3 g of 2-(p-aminophenyl)-6-methyl-7-benzothiazolesulphonic acid are suspended in 955 ml of water. After addition of 69 ml of concentrated hydrochloric acid, 101 ml of 30% strength sodium nitrite solution are added dropwise at 30° C. to 40° C. The mixture is subsequently stirred for one hour, and excess nitrite is destroyed with amidosulphonic acid. The betaine of the diazonium compound is filtered off with suction and washed with 270 ml of demineralised water.

560 ml of demineralised water are then initially introduced into a vessel, the diazotisation paste is added and the mixture is stirred. To this suspension is added, while stirring, a mixture of 50.2 g of barbituric acid and 3.2 g of 1,3-dimethylbarbituric acid, and the pH is brought to 7 with 2.3 g of diethanolamine, 8.0 g of lithium hydroxide monohydrate and 35.2 g of triethanolamine. After clarification, the solution is diluted with 360 ml of water. The dyestuff solution comprises about 12.3 parts by weight of the dyestuff of the formula I and 0.6 part by weight of the dye-stuff of the formula IIa. After storage at −8° C. or +40° C. for three months, the solution shows no residue at all.

EXAMPLE 2

139.3 g of 2-(p-aminophenyl)-6-methyl-7-benzothiazolesulphonic acid are diazotised and the product is isolated and stirred in water again, as in Example 1. To this suspension is added, while stirring, a mixture of 47.6 g of barbituric acid and 6.4 g of 1,3-dimethylbarbituric acid, and the pH is brought to 7 with 2.3 g of diethanolamine, 8.0 g of lithium hydroxide monohydrate and 35.2 g of triethanolamine. After clarification, the solution is diluted with 360 ml of water. The dyestuff solution comprises about 11.7 parts by weight of the dyestuff of the formula I and 1.3 parts by weight of the dyestuff of the formula IIa. After storage at −8° C. or +40° C. for three months, the solution shows no residue at all.

EXAMPLE 3

139.3 g of 2-(p-aminophenyl)-6-methyl-7-benzothiazole-sulphonic acid are diazotised and the product is isolated and stirred in water again, as in Example 1. To this suspension is added, while stirring, a mixture of 50.2 g of barbituric acid and 3.8 g of 1,3-diethylbarbituric acid, and the pH is brought to 7 with 2.3 g of diethanolamine, 8.0 g of lithium hydroxide monohydrate and 35.2 g of triethanolamine. After clarification, the solution is diluted with 360 ml of water. The dyestuff solution comprises about 12.3 parts by weight of the dyestuff of the formula I and 0.7 part by weight of a dyestuff of the formula II where $R_1$ and $R_2$=ethyl. After storage at $-8°$ C. or $+40°$ C. for three months, the solution shows no residue at all.

EXAMPLE 4

139.3 g of 2-(p-aminophenyl)-6-methyl-7-benzothiazole-sulphonic acid are diazotised and the product is isolated and stirred in water again, as in Example 1. To this suspension is added, while stirring, a mixture of 50.2 g of barbituric acid and 3.2 g of 1,3-dimethylbarbituric acid, and the pH is brought to 7 with 4.0 g of diethanolamine, 4.0 g of lithium hydroxide monohydrate and 37.0 g of triethanolamine. After clarification, the solution is diluted with 360 ml of water. The dyestuff solution comprises about 12.3 parts by weight of the dyestuff of the formula I and 0.6 part by weight of the dyestuff of the formula IIa. After storage at $-8°$ C. or $+40°$ C. for three months, the solution shows no residue at all.

EXAMPLE 5

139.3 g of 2-(p-aminophenyl)-6-methyl-7-benzothiazole-sulphonic acid are diazotised and the product is isolated and stirred in water again, as in Example 1. To this suspension is added, while stirring, a mixture of 47.6 g of barbituric acid and 6.4 g of 1,3-dimethylbarbituric acid, and the pH is brought to 7.5 with 4.0 g of diethanolamine, 8.0 g of lithium hydroxide monohydrate and 36.5 g of triethanolamine. After clarification, the solution is diluted with 360 ml of water. The dyeatuff solution comprises about 11.7 parts by weight of the dyestuff of the formula I and 1.3 parts by weight of the dyestuff of the formula IIa. After storage at $-8°$ C. or $+40°$ C. for three months, the solution shows no residue at all.

What is claimed is:

1. A dyestuff mixture comprising the dyestuff of the formula (I)

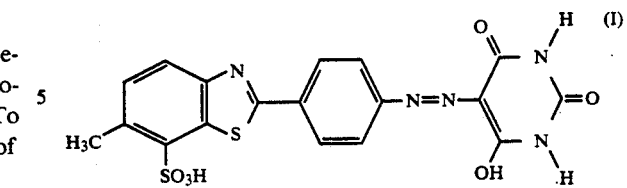

and a dyestuff of the formula

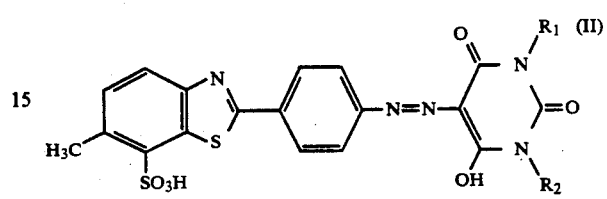

wherein $R_1$ and $R_2$ independently of one another represent alkyl, cycloalkyl or aryl, tautomeric forms of the dyestuffs of the formulae II or mixtures thereof (II).

2. A dyestuff mixture of claim 1, wherein, in formula (II), $R_1$ and $R_2$ independently of one another represent $C_1$-$C_6$-alkyl, $C_3$-$C_6$-cycloalkyl or $C_6$-$C_{10}$-aryl.

3. A dyestuff mixture of claim 1, wherein, in formula (II), $R_1$ and $R_2$ independently of one another represent $C_1$-$C_4$-alkyl.

4. A dyestuff mixture of claim 1, comprising 5 to 25 parts by weight of the dyestuff of the formula (I) and 0.2 to 5 parts by weight of the dyestuff of the formula (IIa)

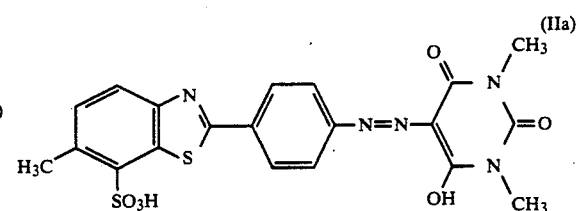

and/or tautomeric forms thereof.

5. A concentrated dyestuff solution comprising a dyestuff mixture according to claim 1.

6. A concentrated dyestuff solution of claim 5, comprising 2 to 30 parts by weight of dyestuff mixture and 98 to 50 parts by weight of water.

7. A concentration dyestuff solution of claim 5, comprising 5 to 25 parts by weight of the dyestuff of the formula (I) and/or tautomeric forms thereof and 0.2 to 5 parts by weight of a dyestuff of the formula (II) and/or tautomeric forms thereof and 94.8 to 70 parts by weight of water.

8. A concentrated dyestuff solution of claim 5, further comprising 1 to 10 parts by weight of triethanolamine.

9. Concentrated dyestuff solutions of claim 5, comprising 7-25 parts by weight of the dyestuff of the formula (I) and/or tautomeric forms thereof, 0.2-2 parts by weight of the dyestuff of the formula (IIa) and/or tautomeric forms thereof, 1-5 parts by weight of triethanolamine, 0.1-0.5 parts by weight of diethanolamine, 0.1-0.5 parts by weight of lithium hydroxide and 91.6-67 parts by weight of water.

* * * * *